April 9, 1940. H. DE SANCTIS 2,196,627
DOG LEASH
Filed Oct. 31, 1938
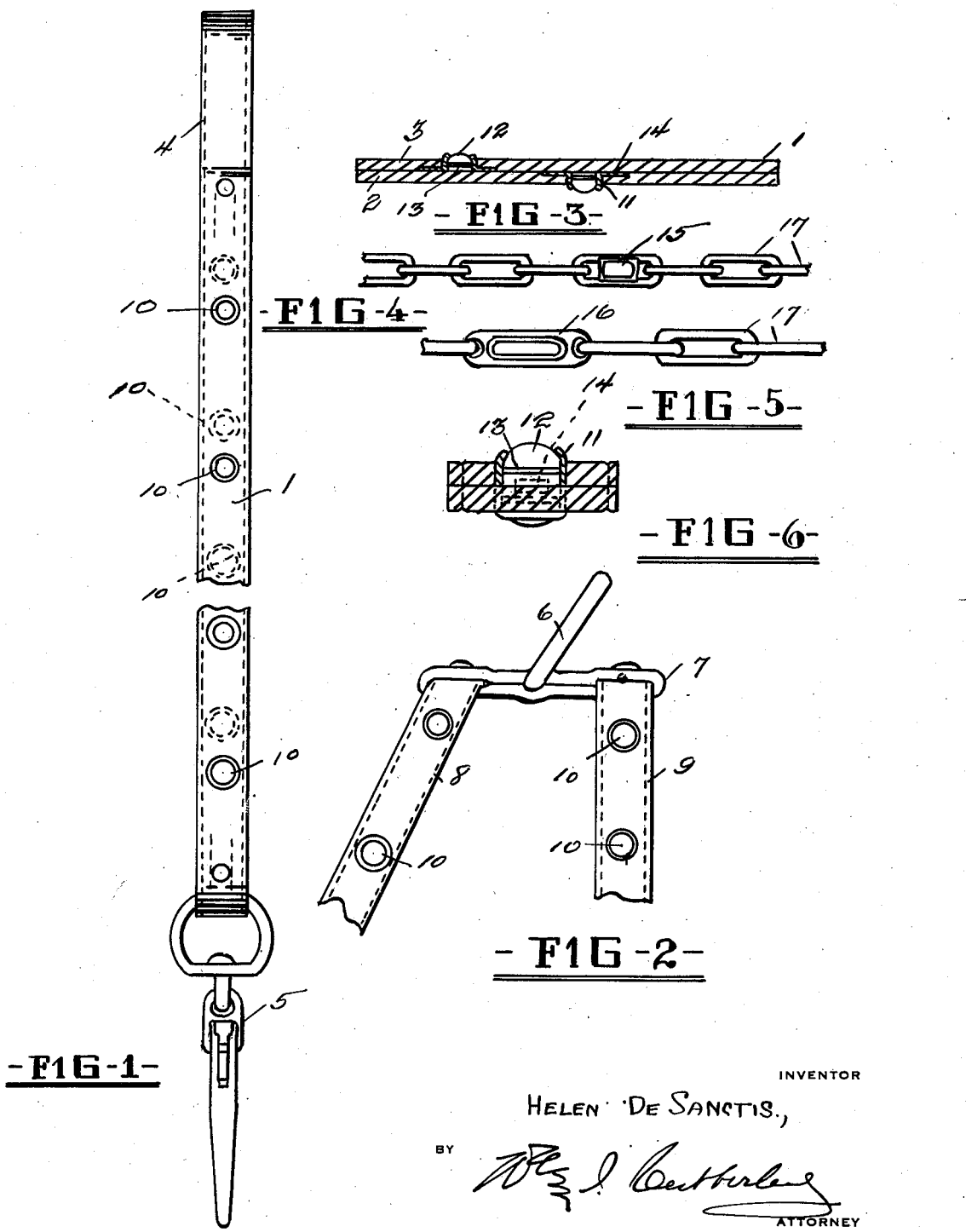
INVENTOR
HELEN DE SANCTIS,
BY
ATTORNEY Patented Apr. 9, 1940

2,196,627

UNITED STATES PATENT OFFICE 2,196,627

DOG LEASH

Helen De Sanctis, New York, N. Y.

Application October 31, 1938, Serial No. 238,015

3 Claims. (Cl. 250—71)

My present invention, in its broad aspect, has to do with improvements in leashes for animals, such for instance as dogs and the like, and while I have here especially mentioned small animals, it has equal application to large animals such as horses and the like, or any animals which carry harness, and whereby the presence of the animal, and of the animal's leash, harness, collar, lead, bridle or the like, may be determined in the darkness or semi-darkness thereby to prevent entanglement of the leash with passersby, or collision, or other contact, and to facilitate locating the animal. I accomplish these and other ends by incorporating in the structure of the leash, harness, collar or the like self-luminous structure which will be visible in the darkness or semi-darkness after the manner of a luminous watch-dial or the like.

Since it is not ordinarily necessary to render the entire structure of a leash, harness, or the like self-luminous, I prefer to embody in the same at fixed and determined intervals self-luminous material, so that the presence of the leash or the like may be ascertained in the darkness or semi-darkness by a passerby and avoided; furthermore since it is very difficult to locate small animals, such as dogs and the like, in the darkness or semi-darkness, I have provided similar semi-luminous structure in collars and harness so that the animal may be readily located.

In large cities small animals, such as dogs and the like, are ordinarily not permitted at large, and when taken from their homes must usually be taken on a leash. When taking such animals out in the evening or at night, especially in crowded parks, passersby become entangled in the leashes as the animals wander to and fro, and to this end a means for ascertaining the presence of the leash is especially desirable; also such animals when occasionally released hide under bushes and the like and are difficult to locate, in which instance my present invention will reveal its presence.

To provide a practical structure for the above purposes a number of contingencies must be met (1) the strength of the leash or harness must not be reduced (2) the self-luminous material must not be of a type or disposition which will annoy the animal (3) the structure must be simple, practical and of very small cost and not likely to get out of order.

With the above and other objects and advantages in view my invention consists in the structure and parts hereinafter described and claimed, but it is emphasized that my invention shall not be restricted to the specific structure shown unless so qualified in the claims, and that interpretation of my invention should only be conclusive when made in the light of said claims.

In the drawing wherein I have illustrated a preferred form and some modifications of my invention:

Figure 1 is a view of a leash or lead (partly broken away) showing the self-luminous insertions therein;

Figure 2 is a fragmentary view of a harness showing the self-luminous insertions therein;

Figure 3 is a section through the leather structure of the leash or harness and shows the disposition and form of the self-luminous buttons;

Figure 4 is a view of a chain leash or lead showing a self-luminous insertion in one of the links, and Figure 5 is a view of a chain leash or lead showing a link formed with a self-luminous face.

Figure 6 is a section through the leather structure of the leash or harness and is a modification of Figure 3.

In the drawing wherein like characters of reference are used to designate like or similar parts throughout the several views:

The numeral 1 designates a leather or fabric lead or leash of conventional construction and having the usual two plys 2 and 3 sewn together. Said leash or lead has a loop 4 at one end and an automatic catch 5 at the other adapted to engage in the attaching ring 6 of a harness 7 formed with the usual neck strap 8 and body strap 9. Arranged at suitably spaced intervals on the leash or lead and on the harness are self-luminous structures 10 the material used to render the same luminous being any desired form of phosphorescent material such for instance as the usual radium derivatives and the like.

The structures 10 are preferably in the nature of buttons having a cylindrical casing part 11 flanged at the outer edge to retain therein a suitable transparent cover element (of glass or the like) designated 12, and back of which is retained the self-luminous material 13. The leash or lead and the harness is provided with openings. The openings in one ply not being in the same place as the openings in the other ply so that the structures 10 may be based on the other ply and held in position by outstanding arms 14; that is it extends through one side only and rests on the remaining side or ply and is retained in place by the arms 14 which extend out between the plys as shown in Figure 3.

Where a chain leash or lead is used, the self-luminous structure may be retained between any of the links by gripping the longitudinal bars of the link as shown in Figure 4 at 15, or if it is desired to use a self-luminous link as 16 in Figure 5 this may be done by inserting such links between any of the conventional links 17 of the chain.

It is believed that the operation and advantages of my invention will be apparent from the foregoing, but attention is again called to the fact that interpretation of my invention should only be conclusive when made in the light of the subjoined claims.

I claim:

1. The combination in a leash and harness for animals of means for rendering such leash and harness discernible comprising a plurality of containers the body part of each of said containers carried in openings in said harness and leash at determined intervals to be out of the way of the animal and of objects contacting the harness and having transparent tops, and self-luminous material carried by said containers back of said tops.

2. The combination in a leash and harness for animals of means for rendering such leash or harness discernible comprising a plurality of containers the body parts of which are removably carried in openings in said harness and leash at predetermined intervals and each container comprising a transparent top, self-luminous material back of the tops and visible therethrough, and outstanding arms for attaching the body part of the container to the harness or leash.

3. The combination in a double ply harness or leash for animals of a self-luminous structure for use with the leash and harness of animals comprising a casing member formed with outstanding arms said casing member adapted to be disposed in openings in the leash or harness and the outstanding arms adapted to be bent to engage between the plys of the leash or harness, and a transparent top for said casing, the casing member flanged to retain the top, and self-luminous material carried in the casing back of the top and visible therethrough.

HELEN DE SANCTIS.